United States Patent
Riedel et al.

(10) Patent No.: US 10,182,277 B2
(45) Date of Patent: Jan. 15, 2019

(54) LOUDSPEAKER ARRANGEMENT FOR A PASSENGER CABIN OF A TRANSPORT MEANS

(71) Applicant: AIRBUS OPERATIONS GMBH, Hamburg (DE)

(72) Inventors: Christian Riedel, Hamburg (DE); Peter Klose, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/808,582

(22) Filed: Nov. 9, 2017

(65) Prior Publication Data

US 2018/0132019 A1 May 10, 2018

(30) Foreign Application Priority Data

Nov. 10, 2016 (DE) .................. 10 2016 222 098

(51) Int. Cl.
| | |
|---|---|
| *H04R 1/02* | (2006.01) |
| *H04R 9/04* | (2006.01) |
| *H04R 31/00* | (2006.01) |
| *B33Y 80/00* | (2015.01) |
| *H04R 7/04* | (2006.01) |

(52) U.S. Cl.
CPC .............. *H04R 1/02* (2013.01); *H04R 9/046* (2013.01); *H04R 9/047* (2013.01); *B33Y 80/00* (2014.12); *H04R 7/04* (2013.01); *H04R 31/00* (2013.01); *H04R 2201/021* (2013.01); *H04R 2499/13* (2013.01)

(58) Field of Classification Search
CPC .......... H04R 9/06; H04R 1/02; H04R 1/2896; H04R 1/345; H04R 1/403; H04R 2231/003; H04R 31/006; H04R 9/04; H04R 19/013; H04R 19/02; H04R 1/2826; H04R 9/046; H04R 9/047
See application file for complete search history.

(56) References Cited

U.S. PATENT DOCUMENTS

| | | | | |
|---|---|---|---|---|
| 7,283,636 | B2 * | 10/2007 | Nishimura | ............... H04R 7/04 381/152 |
| 9,834,320 | B2 * | 12/2017 | Lucas | ............... B64D 47/02 |
| 2006/0291688 | A1 * | 12/2006 | Nishimura | ............... H04R 9/06 381/396 |

(Continued)

FOREIGN PATENT DOCUMENTS

| | | |
|---|---|---|
| EP | 0996311 A1 | 4/2000 |
| EP | 2986025 A2 | 2/2016 |

OTHER PUBLICATIONS

German Search Report for German Application No. 102016222098 dated Jul. 3, 2017.

*Primary Examiner* — Mohammad Islam
(74) *Attorney, Agent, or Firm* — Jenkins, Wilson, Taylor & Hunt, P.A.

(57) ABSTRACT

A loudspeaker arrangement for a passenger cabin of a transport means, including a loudspeaker and a housing having a receiver for the loudspeaker. The loudspeaker includes at least one membrane capable of oscillation and at least one loudspeaker coil. The loudspeaker coil is integrated into the membrane capable of oscillation, wherein the membrane electrically insulates the loudspeaker coil at least in part.

15 Claims, 5 Drawing Sheets

(56) References Cited

U.S. PATENT DOCUMENTS

| | | | | |
|---|---|---|---|---|
| 2010/0119095 A1* | 5/2010 | Grenzing | ............... | H04R 7/045 |
| | | | | 381/332 |
| 2014/0079252 A1* | 3/2014 | Klein | ....................... | H04R 1/02 |
| | | | | 381/152 |
| 2015/0256912 A1* | 9/2015 | Nedelman | ........... | B60R 11/0217 |
| | | | | 381/389 |
| 2018/0081406 A1* | 3/2018 | Kita | ....................... | H04R 11/02 |

\* cited by examiner

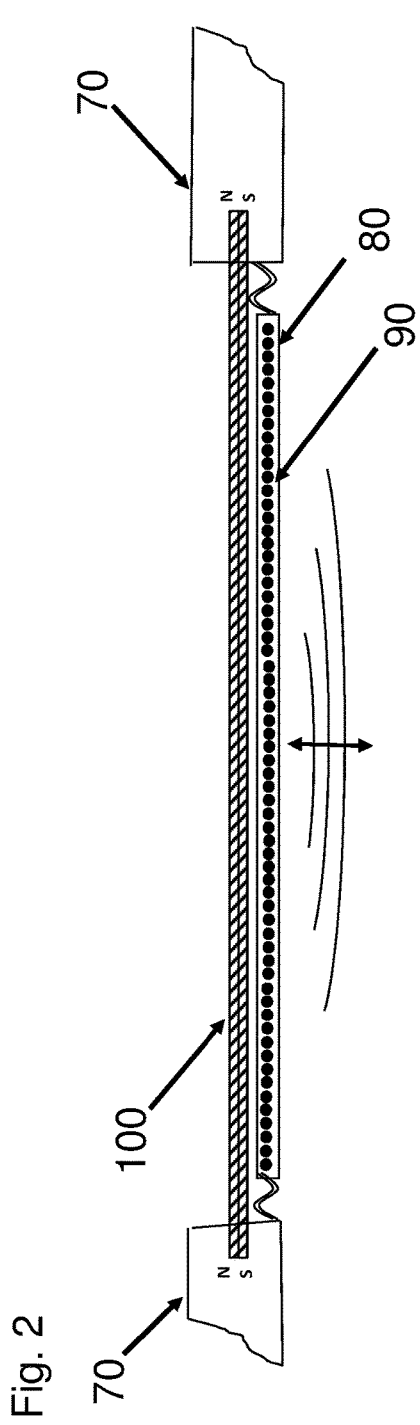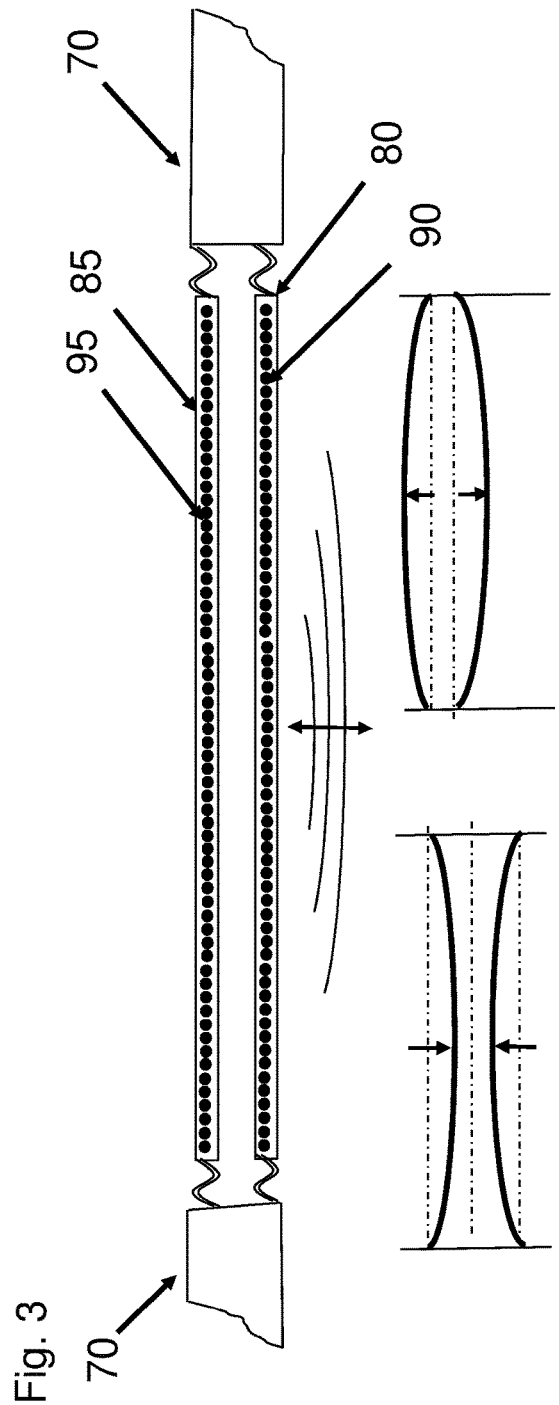

LOUDSPEAKER ARRANGEMENT FOR A PASSENGER CABIN OF A TRANSPORT MEANS

CROSS-REFERENCE TO RELATED APPLICATION

This application claims priority to German patent application DE 10 2016 222 098.5 filed Nov. 10, 2016, the entire disclosure of which is incorporated by reference herein.

TECHNICAL FIELD

A loudspeaker arrangement for a passenger cabin of a transport structure or vehicle and a passenger cabin of a transport means, structure or vehicle having such a loudspeaker arrangement are presented herein.

Such a passenger cabin is found, for example, in commercial aircraft but, in adapted form, also in buses, passenger cars, trains and passenger ships, for example, and can comprise one or more passenger service unit/s (PSU).

BACKGROUND

In particular, at least one such passenger service unit is incorporated in commercial aircraft in the pressurized cabin above each row of passenger seats. It can contain inter alia reading lights, oxygen masks, which fall from an opening in the event of a drop in pressure, and indication signs. In addition, a loudspeaker arrangement (audio system) for announcements made by personnel is also conventionally situated therein.

The integration of loudspeaker arrangements into passenger cabins, in particular into passenger service units, can take place in so-called "panels", which are parts of the passenger cabins or passenger service units. The size of the loudspeaker makes demands on these panels in terms of space. Consequently, the panels, or the passenger service units, must have a specific minimum size in order to accommodate such loudspeaker arrangements. However, especially in aircraft, passenger service units preferably have as small an installation size as possible.

For reasons of durability, hygiene and ease of care, preference is given to loudspeaker arrangements that have a closed housing without acoustic openings and that are capable of operating without cost-intensive additional moisture proofing.

A known solution is the use of so-called exciter loudspeakers, which fulfil the above-mentioned requirements. Disadvantages of exciter loudspeakers are their comparatively great weight owing to the components that are required, in particular the resonance magnets, and a comparatively large space requirement.

There is therefore a need for a compact loudspeaker arrangement for a passenger cabin of a transport means, structure or vehicle, which arrangement is suitable in particular for integration into a panel.

SUMMARY

For that purpose there is proposed a loudspeaker arrangement which has a loudspeaker and a housing having a receiver for the loudspeaker. The loudspeaker comprises at least a first membrane capable of oscillation and a first loudspeaker coil. The first loudspeaker coil is integrated into the first membrane capable of oscillation. The first membrane capable of oscillation thereby electrically insulates the first loudspeaker coil, at least in part.

For example, the first membrane capable of oscillation electrically insulates the first loudspeaker coil apart from at least two connection points.

The proposed loudspeaker arrangement is suitable for manufacture by a 3D printing process and permits a very compact construction with few components. This permits a loudspeaker arrangement which can be manufactured efficiently and, in addition, is lighter than comparable loudspeaker arrangements for passenger cabins of a transport means, structure or vehicle.

In a variant, the first loudspeaker coil can be formed by an electrical conductor which extends in the shape of a spiral substantially orthogonally to the thickness direction of the first membrane capable of oscillation. Other forms of the conductor are conceivable. This conductor can pass through the first membrane capable of oscillation at the connection points.

The thickness direction can also be referred to as the membrane surface direction or membrane thickness direction. It denotes the direction directly from one extensive surface of a membrane to the opposite extensive surface of the membrane. In other words, the thickness direction can correspond to a direction which is parallel to a surface normal to the surface of the membrane.

The loudspeaker arrangement can further comprise a second membrane capable of oscillation and a second loudspeaker coil. The second loudspeaker coil can be integrated into the second membrane capable of oscillation. The loudspeaker coil which is integrated into the second membrane capable of oscillation can be formed by an electrical conductor which extends in the shape of a spiral substantially orthogonally to the thickness direction of the second membrane capable of oscillation. Other forms of the conductor are conceivable. The second membrane capable of oscillation thereby electrically insulates the second loudspeaker coil, at least in part.

For example, the second membrane capable of oscillation electrically insulates the second loudspeaker coil apart from at least two connection points.

By the second membrane capable of oscillation having the second loudspeaker coil, an increase in the possible loudspeaker output can be achieved with only a slightly increased total weight and a virtually identical size of the loudspeaker arrangement.

In one embodiment, the first loudspeaker coil and the second loudspeaker coil are electrically connected at a connection point, while a second connection point of each of the first and second loudspeaker coils serves for connection to a current or voltage source. This results in a series circuit of the loudspeaker coils. The series circuit can additionally include in particular electronic components having capacitive or inductive properties. These can either intentionally bring about a phase shift of the current and voltage profile or counteract an existing phase shift between the current and voltage profile.

In another embodiment, the first loudspeaker coil and the second loudspeaker coil are each electrically connected at two connection points. This results in a parallel circuit of the loudspeaker coils. The voltage or current profile at the two coils is thus in phase. This is advantageous for generating a common in-phase oscillation.

The first loudspeaker coil and the second loudspeaker coil can also be fed with in-phase voltage or current profiles of opposite polarity, so that the magnetic fields produced thereby are likewise of opposite polarity.

In a variant, the loudspeaker arrangement can further comprise an arrangement of electronic components. The arrangement can be integrated into the first and/or second membrane capable of oscillation. The arrangement of electronic components can comprise, for example, resistors, diodes, transistors, thyristors, photosemiconductors as well as electronic components having capacitive and inductive properties.

By integrating electronic components into the membrane/s capable of oscillation, for example by a 3D printing process, complex circuit logics, for example for controlling the loudspeaker, can also be integrated into the loudspeaker arrangement in a space- and weight-efficient manner. For example, an amplifier unit can also be integrated into the loudspeaker arrangement.

In one embodiment, the housing can be configured to form the first membrane capable of oscillation with a portion of its housing body. The first membrane capable of oscillation is in this embodiment part of the housing and is thus made of the same material as the housing itself. The first membrane capable of oscillation can thereby be flush with the housing surrounding it, at least in the rest state, and form a planar surface without raised elements.

This embodiment permits the manufacture of a loudspeaker arrangement which is almost invisible at least from outside and in particular from the point of view of a passenger in the passenger cabin.

In another embodiment, the first membrane capable of oscillation is not part of the housing but is connected thereto, for example by adhesive bonding or lamination. The connection with the housing does not interfere with the ability of the magnet to oscillate.

The first and/or the second membrane capable of oscillation can at least in part comprise or be made of carbon-fiber-reinforced plastics material, glass-fiber-reinforced plastics material, polyphenylene terephthalamide or polytetrafluoroethylene.

The mentioned materials are resistant to external damage and are therefore particularly suitable for the construction of loudspeakers which are intended to have a long useful life.

In one embodiment, the first membrane capable of oscillation is configured and arranged to form an outer side of the loudspeaker with one of its surfaces.

In a variant, the first membrane capable of oscillation is flush with the housing surrounding it in the rest state and forms with the housing a planar surface without raised elements.

Both the first and the second membrane capable of oscillation and/or the housing can be provided with air equalization holes, which prevent pressure differences with respect to the exterior of the loudspeaker arrangement from occurring inside the loudspeaker arrangement, which adversely affect the functioning of the loudspeaker.

In one embodiment, the loudspeaker arrangement further comprises a magnet arrangement which is configured and arranged to produce a magnetic field which exerts a magnetic force on at least those portions of the membrane/s capable of oscillation through which an electrical conductor passes.

A surface of each of the first and/or second membrane capable of oscillation can face the magnet arrangement.

The magnet arrangement can comprise or consist of one or more magnets, which can be fixedly connected to the housing.

In one embodiment, at least one of the magnets of the magnet arrangement is a permanent magnet. The permanent magnet can be fixedly connected to the housing.

In one embodiment, at least one of the magnets of the magnet arrangement is an electromagnet. The electromagnet can be fixedly connected to the housing.

The use of an electromagnet has the advantage over the use of a permanent magnet that the magnetic field strength of the magnet can be influenced by its voltage or current supply.

At least one magnet of the magnet arrangement can be capable of oscillation, for example in the frequency range between 16 Hz and 20 kHz. Other frequency ranges are likewise possible. The magnet can be in the form of magnetic foil. The magnet arrangement can be configured and arranged to emit sound in conjunction with the first and/or the second membrane capable of oscillation.

In this case, the magnet, in addition to its property as a loudspeaker magnet, serves as a vibration-generating element and thus contributes very efficiently to the generation of sound. An even more compact and weight-saving form of the loudspeaker arrangement is thus made possible.

A 3D printing process can be used to produce the individual components of the loudspeaker arrangement. This on the one hand allows the housing and the receiver for the loudspeaker to be produced in their spatial form. For example, a 3D printing process permits the production of an arrangement in which a portion of the housing forms the first membrane capable of oscillation. On the other hand, a 3D printing process permits the production of a membrane capable of oscillation having an integrated electrical conductor, which forms a loudspeaker coil of the loudspeaker arrangement. A 3D printing process also allows electronic components to be integrated into a membrane. The manufacture of a magnetic foil capable of oscillation is also possible by a 3D printing process.

A 3D printing process is therefore particularly suitable for implementing the solution presented herein and its variants, because magnets, electrical conductors, electronic components and membranes can be manufactured so that they are built up on top of one another or integrated into one another, and a permanent connection of the components of the arrangement can also be achieved without problems.

A passenger cabin of a transport means, structure or vehicle and/or a panel, for example a passenger service unit, of the passenger cabin can comprise a loudspeaker arrangement in one of the above-mentioned variants. The housing of the loudspeaker arrangement can thereby be formed by part of the passenger cabin, in particular by part of the passenger service unit or of a panel, or can be fixedly connected to one of those elements. The panel can be a cover or cladding in the passenger cabin. The loudspeaker arrangement can be integrated into or mounted in a wall, for example a partition wall, ceiling wall or side wall, of the passenger cabin.

BRIEF DESCRIPTION OF THE DRAWINGS

Further features, properties, advantages and possible modifications will become clear to a person skilled in the art from the following description, in which reference is made to the accompanying example drawings. The figures show, in schematic form, an exemplary embodiment of a loudspeaker arrangement, without limiting the variants of the described device thereto.

In FIG. 1, the first membrane capable of oscillation forms the outside of the loudspeaker arrangement and is formed by a portion of the housing.

FIG. 2 shows, in schematic form, a similar loudspeaker arrangement. The first membrane capable of oscillation forms the outside of the loudspeaker arrangement. The membrane is made of a different material from the housing but is connected thereto.

FIG. 3 shows, in schematic form, a loudspeaker arrangement having two membranes capable of oscillation.

DETAILED DESCRIPTION

All the components of the arrangement shown in FIGS. 1 through 6 that are shown are produced by way of example by a 3D printing process and connected together. In the embodiments shown, the loudspeaker arrangement has a front surface extent of approximately 200 mm×300 mm (approximately DIN A4 format). However, any other front surface formats can be chosen for the loudspeaker arrangement.

Figure 1:
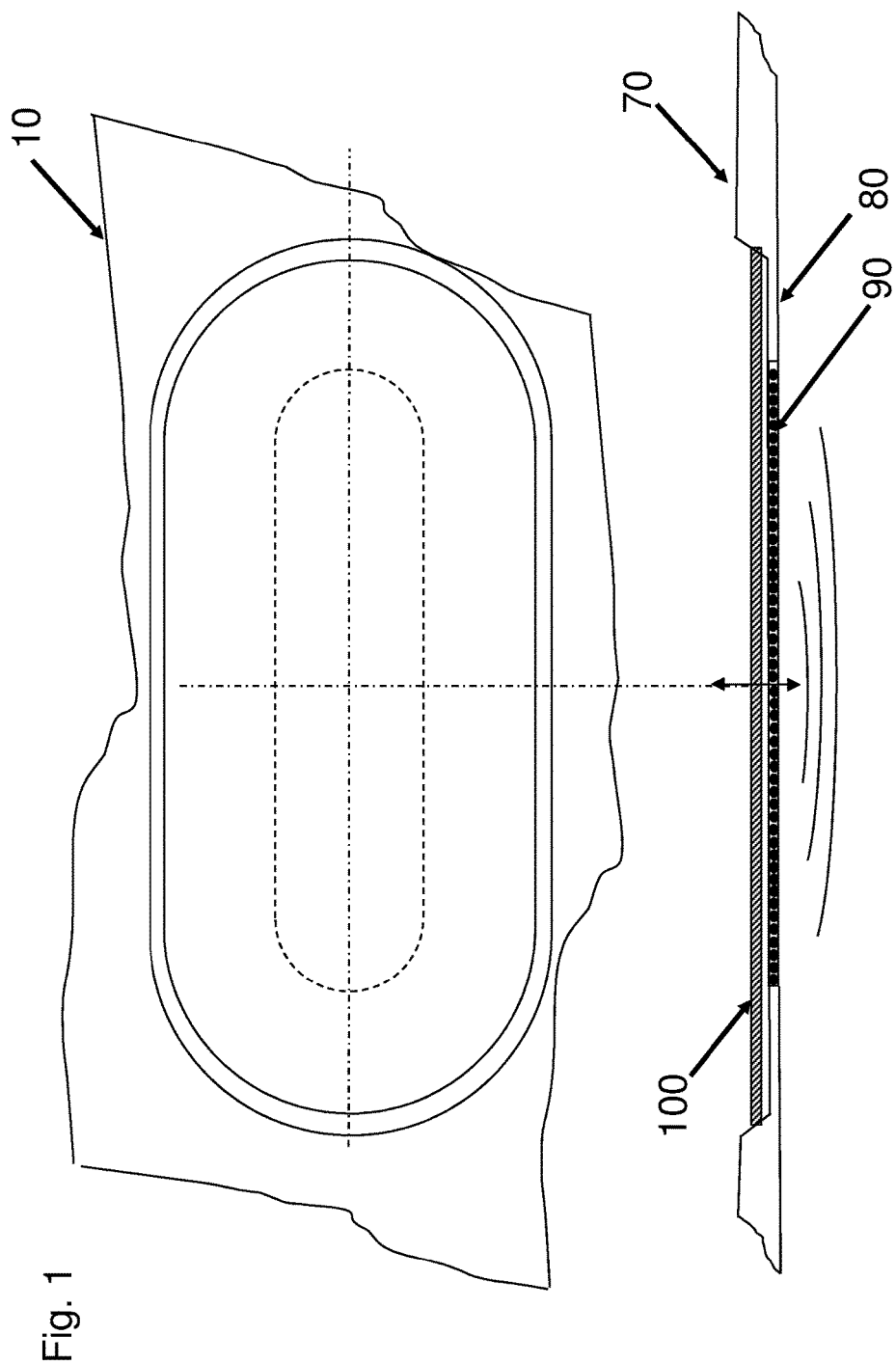
FIG. 1 shows, in schematic form, a top view and a cross-section of a loudspeaker arrangement integrated into a cover panel.

FIG. 1 shows, in schematic form, a top view and a cross-section of a loudspeaker arrangement integrated into a cover panel which is to be found, for example, in the passenger cabin of a commercial aircraft.

The housing 10 forms, as shown, a receiver 70 which, together with the first membrane 80 capable of oscillation and the permanent magnet 100, delimits a resonant cavity.

The first membrane capable of oscillation 80 is here formed by a portion of the housing 10. In a portion of the first membrane capable of oscillation 80 there is integrated in FIG. 1 by way of example an electrical conductor in the shape of a spiral, which has inductive properties, owing to its form, and passes through the first membrane capable of oscillation 80 at two connection points (not shown in FIG. 1). The electrical conductor thus forms the first loudspeaker coil 90 which, apart from the connection points, is completely electrically insulated by the membrane capable of oscillation 80.

The first membrane capable of oscillation 80 forms the outside of the loudspeaker arrangement with one of its surfaces. The surface opposite the outside faces the permanent magnet 100.

The permanent magnet 100 is fixedly connected to the housing 70 and is not capable of oscillation in the exemplary embodiment shown in FIG. 1.

The electromagnetic field produced by the current or voltage profile fed through the loudspeaker coil 90, in conjunction with the fixed permanent magnet 100, excites the loudspeaker coil 90, and thus the membrane 80 connected thereto, to oscillation and thus to the emission of a sound. Both the membrane 80 and the housing 70 have a number of air equalization holes (not shown) which prevent pressure differences with respect to the exterior of the loudspeaker arrangement from occurring inside the loudspeaker arrangement, which adversely affect the functioning of the loudspeaker.

The embodiment shown in FIG. 2 differs from the embodiment shown in FIG. 1 in that the first membrane capable of oscillation 80, into which the loudspeaker coil 90 is integrated, is manufactured from polyphenylene terephthalamide, for example, and is connected to the housing 70 in such a manner that it is capable of oscillation.

The first membrane capable of oscillation 80 here likewise has a number of air equalization holes (not shown).

FIG. 3 shows a variant of the loudspeaker arrangement, which comprises a first membrane capable of oscillation 80 and a second membrane capable of oscillation 85, which membranes are each connected to the housing 70 in such a manner that they are capable of oscillation. In FIG. 3, the two membranes are produced from polytetrafluoroethylene, for example, and are identical in form. The membranes 80 and 85 shown in FIG. 3 also contain air equalization holes (not shown).

In the loudspeaker arrangement shown in FIG. 3, in-phase currents of opposite polarity flow through each of the loudspeaker coils 90 and 95, so that the associated magnetic fields are likewise produced with opposite polarity. The loudspeaker coils 90 and 95, and thus the membranes 80 and 85 connected thereto, are thus excited to oscillation, which causes a sound.

The arrangement shown in FIG. 3 is suitable for mounting in a partition wall of a passenger cabin for a transport means, structure or vehicle, since a sound is emitted in two opposite directions by the loudspeaker arrangement. At the same time, the loudspeaker arrangement shown in FIG. 3 contains only two membranes capable of oscillation 80 and 85, as well as the loudspeaker coils 90 and 95 integrated therein. The loudspeaker arrangement shown in FIG. 3 is thus the potentially most space-efficient exemplary embodiment among the variants shown in the figures.

Figure 4:
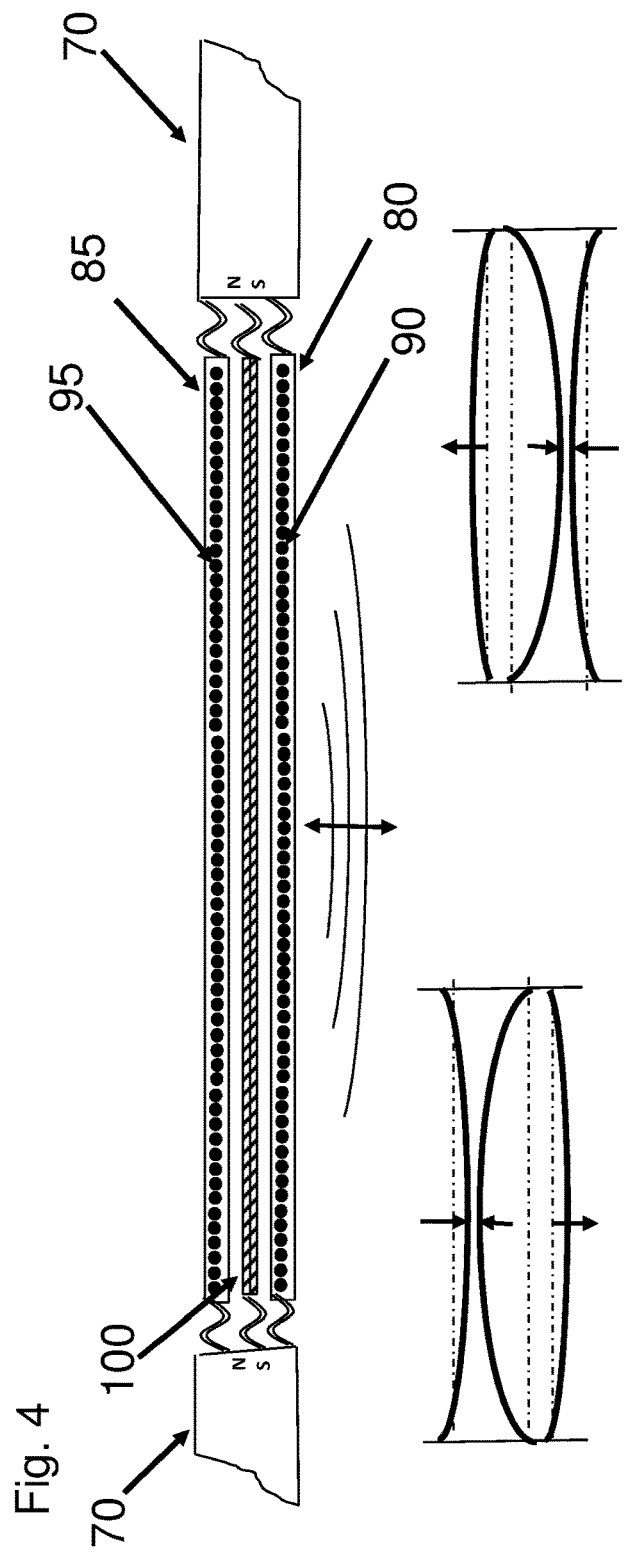
FIG. 4 shows, in schematic form, a loudspeaker arrangement having two membranes capable of oscillation and a magnetic foil capable of oscillation.

FIG. 4 shows a loudspeaker arrangement comprising a first membrane capable of oscillation 80, a loudspeaker coil 90 integrated into the membrane 80, a second membrane capable of oscillation 85, a loudspeaker coil 95 integrated into the membrane 85, and a magnetic foil capable of oscillation 100. The membranes comprise or are made of carbon-fiber-reinforced plastics material. The magnetic foil 100 serves both as a loudspeaker magnet and as an element capable of oscillation. In the exemplary embodiment shown in FIG. 4, the magnetic foil 100 is a permanently magnetic, resilient magnetic foil capable of oscillation in the range of, for example, from 16 Hz to 20 KHz (other frequency ranges are possible), which is produced by a 3D printing process and one extensive foil surface of which faces each of the membranes capable of oscillation 80 and 85. Both the membrane 80 and the membrane 85 have a number of air equalization holes (not shown).

Figure 5:
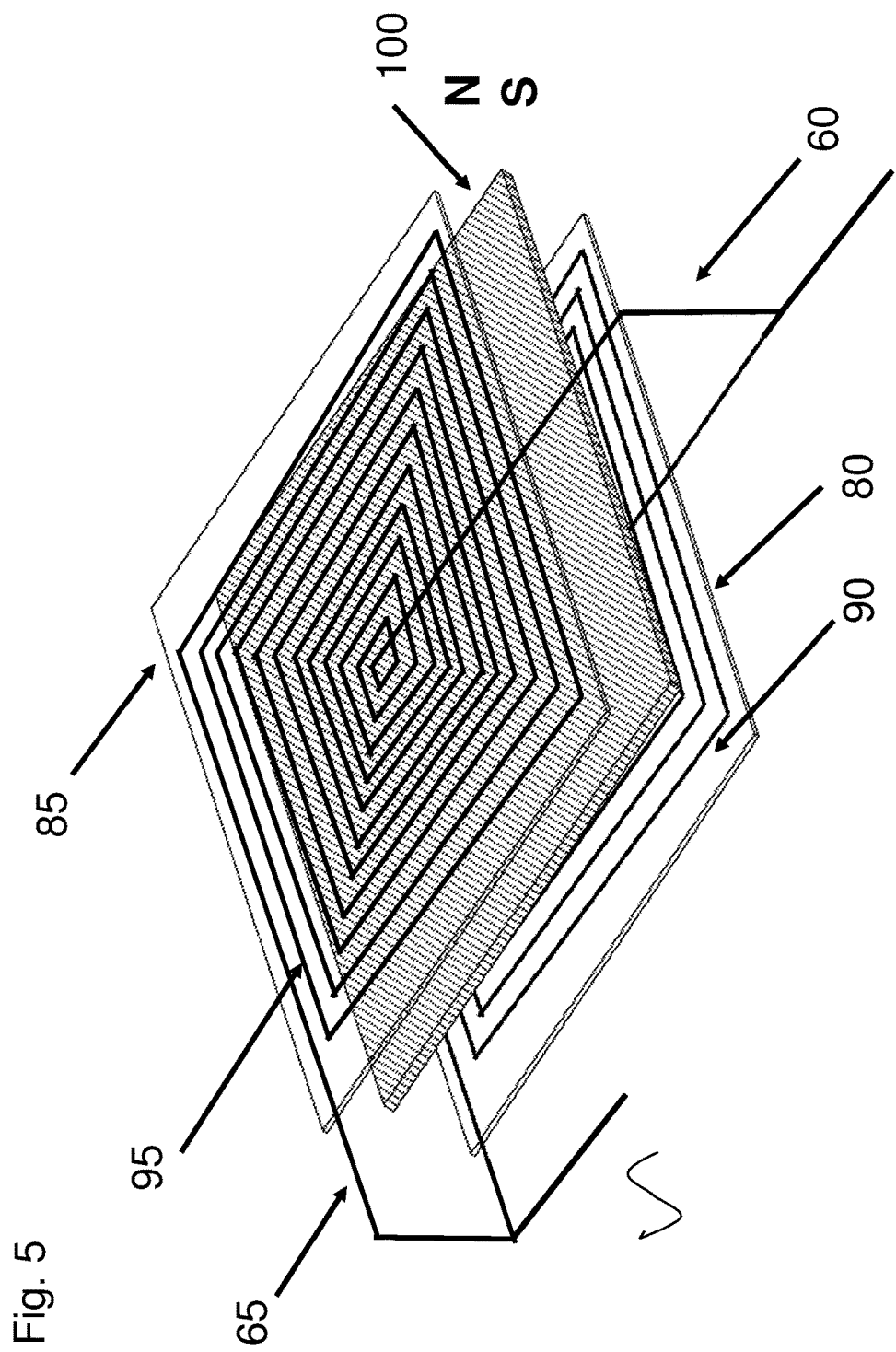
FIG. 5 shows the loudspeaker arrangement of FIG. 4 in a perspective view.

FIG. 5 shows the same loudspeaker arrangement as FIG. 4, but in a perspective view. The conductors integrated in the shape of a spiral into each of the first and second membranes capable of oscillation 80, 85 form the loudspeaker coils 90 and 95. The first loudspeaker coil 90 is electrically connected to the second loudspeaker coil 95 at each of the connection points 60 and 65, so that in each case the same electric current or voltage profile is supplied thereto.

Since the loudspeaker coils 90 and 95 shown in this embodiment are additionally of identical construction, the two loudspeaker coils 90 and 95, in conjunction with the magnetic foil 100, each produce the same oscillation when an electric current or voltage profile is supplied.

Furthermore, since the membranes capable of oscillation 80 and 85 shown in FIGS. 4 and 5 are so positioned relative to one another that the paths of the loudspeaker coils 90 and 95 run parallel to one another, the oscillations of the two membranes capable of oscillation 80 and 85 produced by the loudspeaker coils 90 and 95 are in phase relative to one another.

Since the magnetic foil 100 is likewise capable of oscillation, all three elements are set in a common vibration by the supply of a current or voltage profile at the connection points 60 and 65. In conjunction with the resonant cavity delimited by the receiver 70, a sound is thus produced, which is emitted by the loudspeaker arrangement.

Because it has very few components and the components are each integrated into one another, the loudspeaker is particularly compact and lightweight. It is therefore suitable for mounting in a passenger cabin of a transport means.

Figure 6:
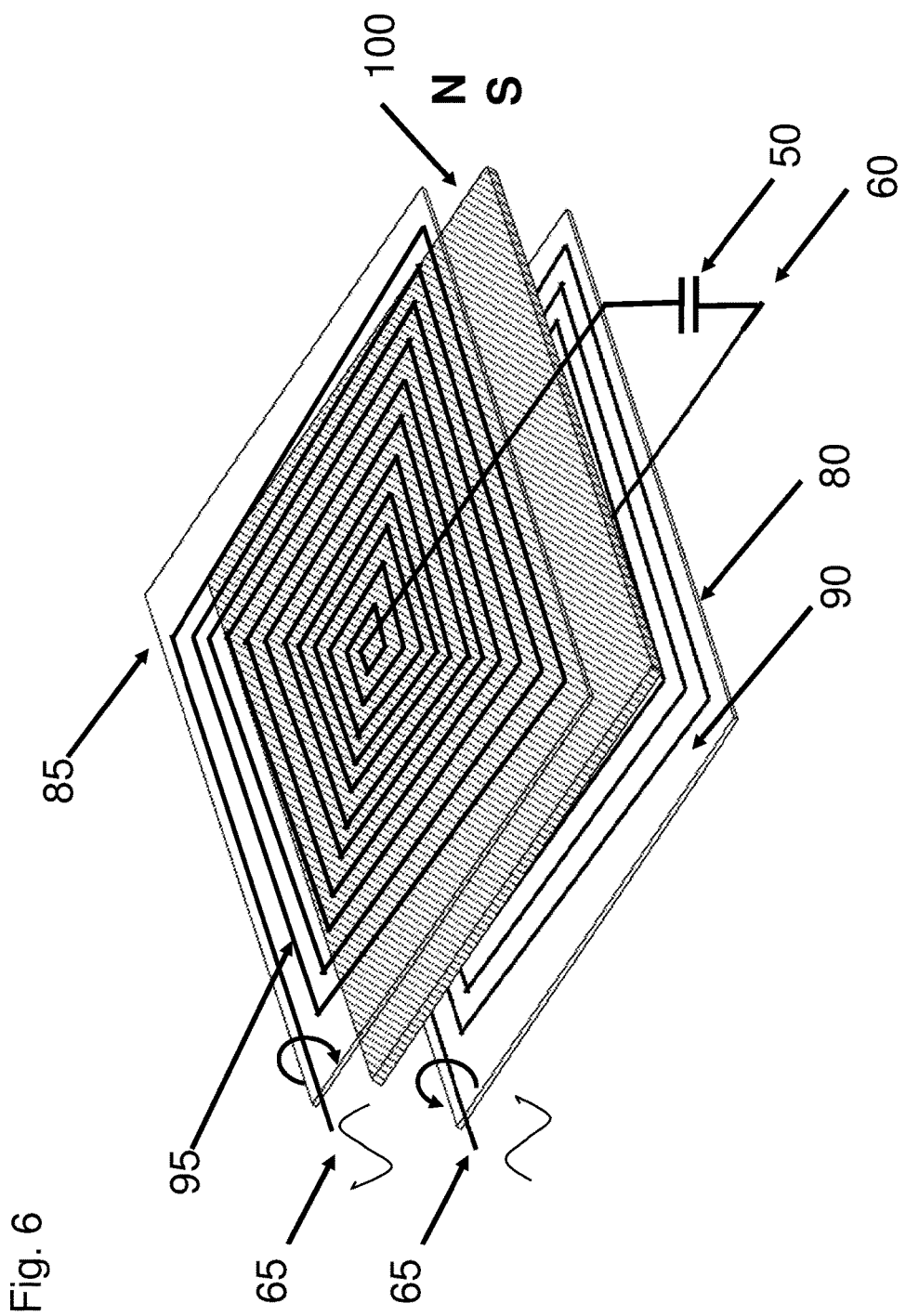
FIG. 6 shows an alternative loudspeaker arrangement to that of FIG. 4 and FIG. 5 in a perspective view.

FIG. 6 shows an alternative construction of the loudspeaker arrangement. In this variant, the first loudspeaker coil 90 and the second loudspeaker coil 95 are connected at the connection point 60 to form a series circuit. An additional capacitor 50 counteracts the phase shift between the current and voltage profile caused by the loudspeaker coils 90 and 95.

The above-described variants of the device and the structural and operational aspects thereof serve merely for better understanding of the structure, the functioning and the properties; they do not limit the disclosure, for example, to the exemplary embodiments. The figures are partly schematic, important properties and effects in some cases being shown on a significantly enlarged scale in order to clarify the functions, active principles, technical configurations and features. Any mode of functioning, any principle, any technical configuration and any feature that is/are disclosed in the figures or in the text can be combined freely and arbitrarily with all the claims, any feature in the text and in the other figures, other modes of functioning, principles, technical configurations and features which are contained in this disclosure or follow therefrom, so that all conceivable combinations are to be assigned to the described procedure. Combinations between all the individual implementations in the text, that is to say in every section of the description, in the claims, and also combinations between different variants in the text, in the claims and in the figures, are also included. The claims also do not limit the disclosure and thus the possible combinations of all the indicated features with one another. All the disclosed features are explicitly also disclosed herein individually and in combination with all the other features.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A loudspeaker arrangement for a passenger cabin of a transport structure or vehicle, comprising
 a loudspeaker and a housing having a receiver for the loudspeaker;
 the loudspeaker comprising a first membrane capable of oscillation, a first loudspeaker coil, and a magnet arrangement;
 the first loudspeaker coil being integrated into the first membrane capable of oscillation; and
 wherein the first membrane capable of oscillation electrically insulates the first loudspeaker coil at least in part,
 wherein the magnet arrangement is arranged to produce a magnetic field to exert a magnetic force on at least portions of the first membrane capable of oscillation through which an electrical conductor passes, and
 wherein at least one magnet of the magnet arrangement, which is a magnetic foil, is capable of oscillation and arranged to emit sound in conjunction with the first membrane capable of oscillation.

2. The loudspeaker arrangement of claim 1, wherein the first loudspeaker coil is formed by an electrical conductor which extends in a shape of a spiral substantially orthogonally to a thickness direction of the first membrane capable of oscillation and which passes through the first membrane capable of oscillation at least at connection points.

3. The loudspeaker arrangement of claim 1, further comprising:
 a second membrane capable of oscillation and a second loudspeaker coil;
 the second loudspeaker coil being integrated into the second membrane capable of oscillation; and
 wherein the second membrane capable of oscillation electrically insulates the second loudspeaker coil at least in part.

4. The loudspeaker arrangement of claim 3, wherein the second loudspeaker coil is formed by an electrical conductor which extends in a shape of a spiral substantially orthogonally to a thickness direction of the second membrane capable of oscillation, and passes through the second membrane capable of oscillation at least at connection points.

5. The loudspeaker arrangement of claim 3, wherein the first loudspeaker coil is electrically connected to the second loudspeaker coil at at least one connection point.

6. The loudspeaker arrangement of claim 1, further comprising:
 an arrangement of electronic components which is integrated into the first and/or into the second membrane, wherein the arrangement of electronic components comprises resistors, diodes, transistors, thyristors, photosemiconductors, and/or components having capacitive or inductive properties.

7. The loudspeaker arrangement of claim 1, wherein
 the first membrane capable of oscillation is formed by a portion of the housing, or
 the first membrane capable of oscillation is connected to the housing by adhesive bonding or lamination, and/or
 the first membrane capable of oscillation is flush with the housing surrounding it in the rest state and forms a planar surface without raised elements.

8. The loudspeaker arrangement of claim 1, wherein the first membrane capable of oscillation is configured and arranged to form an outer side of the loudspeaker with one of its surfaces.

9. The loudspeaker arrangement of claim 1, wherein
 the first and/or the second membrane capable of oscillation is manufactured at least in part of carbon-fiber-reinforced plastics material, glass-fiber-reinforced plastics material, polyphenylene terephthalamide or polytetrafluoroethylene, and/or
 the first and/or the second membrane capable of oscillation each has one or more air equalization hole, and/or
 the housing has one or more air equalization hole.

10. The loudspeaker arrangement of claim 3,
 wherein the magnet arrangement is configured and arranged to produce a magnetic field which exerts a magnetic force on at least portions of the first and the second membranes capable of oscillation through which an electrical conductor passes, and wherein a surface of each of the first and/or the second membrane capable of oscillation faces the magnet arrangement.

11. The loudspeaker arrangement of claim 1, wherein at least one magnet of the magnet arrangement is an electromagnet, and/or at least one magnet of the magnet arrangement is a permanent magnet.

12. The loudspeaker arrangement of claim 1, wherein the magnetic foil is capable of oscillation in a frequency range from 16 Hz to 20 kHz and is configured and arranged to emit sound in conjunction with the first and/or the second membrane capable of oscillation.

13. The loudspeaker arrangement of claim 3, wherein the housing is manufactured by a 3D printing process, and/or the receiver is manufactured by a 3D printing process, and/or the first and/or the second membrane capable of oscillation is manufactured by a 3D printing process, and/or the first and/or the second loudspeaker coil is manufactured by a 3D printing process, and/or the magnet arrangement is manufactured, at least in part, by a 3D printing process, and/or an arrangement of electronic components is manufactured by a 3D printing process.

14. A passenger cabin for a transport structure or vehicle, comprising a loudspeaker arrangement comprising:

a loudspeaker and a housing having a receiver for the loudspeaker;

the loudspeaker comprising a first membrane capable of oscillation, a first loudspeaker coil, and a magnet arrangement;

the first loudspeaker coil being integrated into the first membrane capable of oscillation; and wherein the first membrane capable of oscillation electrically insulates the first loudspeaker coil at least in part, wherein the housing of the loudspeaker is formed by part of the passenger cabin or is permanently connected to the passenger cabin, wherein the magnet arrangement is arranged to produce a magnetic field to exert a magnetic force on at least portions of the first membrane capable of oscillation through which an electrical conductor passes, and wherein at least one magnet of the magnet arrangement, which is a magnetic foil, is capable of oscillation and is arranged to emit sound in conjunction with the first membrane capable of oscillation.

15. The passenger cabin of claim 14, wherein the transport structure or vehicle comprises an aircraft.

* * * * *